United States Patent [19]

Siwiak et al.

[11] Patent Number: 5,325,403
[45] Date of Patent: Jun. 28, 1994

[54] METHOD AND APPARATUS FOR DUAL-CHANNEL DIVERSITY RECEPTION OF A RADIO SIGNAL

[75] Inventors: Kazimierz Siwiak, Coral Springs; Robert J. Schwendeman, Pompano Beach, both of Fla.

[73] Assignee: Motorola, Inc., Schaumburg, Ill.

[21] Appl. No.: 987,873

[22] Filed: Dec. 9, 1992

[51] Int. Cl.⁵ .......................... H04B 7/08; H04L 1/06
[52] U.S. Cl. ..................................... 375/100; 329/308; 455/134
[58] Field of Search ............... 375/40, 81, 100, 107; 329/307–308; 455/83–84, 134, 137–138, 141

[56] References Cited

U.S. PATENT DOCUMENTS

| | | | |
|---|---|---|---|
| 4,112,370 | 9/1978 | Monsen | 375/100 |
| 4,506,385 | 3/1985 | Fedde et al. | 375/100 |
| 4,710,944 | 12/1987 | Nossen | 375/100 |
| 4,742,568 | 5/1988 | Furuya | 455/277 |
| 4,853,972 | 8/1989 | Ueda et al. | 455/83 |
| 4,914,714 | 4/1990 | Tamura | 455/78 |
| 5,023,621 | 6/1991 | Ushiyama et al. | 343/702 |
| 5,097,484 | 3/1992 | Akaiwa | 375/40 |
| 5,144,296 | 9/1992 | DeLuca et al. | 340/825.44 |

FOREIGN PATENT DOCUMENTS 9107829 5/1991 PCT Int'l Appl. ................... 375/100

*Primary Examiner*—Stephen Chin
*Assistant Examiner*—Young Tse
*Attorney, Agent, or Firm*—R. Louis Breeden

[57] ABSTRACT

A data communication receiver (100) includes a first antenna feed (106) coupled to a first receiver element (110) for demodulating (502) a radio signal containing data bits and for deriving a first phase-locked loop error signal. The data communication receiver (100) also includes a second antenna feed (108) coupled to a second receiver element (112) for demodulating (502) the radio signal and for deriving a second phase-locked loop error signal. A received signal strength indicator (134, 144) measures signal strength of the radio signal from the first antenna feed (106) during reception of a data bit, and concurrently measures signal strength from the second antenna feed (108). A processor (146) then defines (506, 508, 512) the data bit as received from the antenna feed (106, 108) having the greater signal strength to be the optimum data bit.

20 Claims, 7 Drawing Sheets

METHOD AND APPARATUS FOR DUAL-CHANNEL DIVERSITY RECEPTION OF A RADIO SIGNAL

FIELD OF THE INVENTION

This invention relates in general to radio communication receivers, and more specifically to a method and apparatus for dual-channel diversity reception of a radio signal.

BACKGROUND OF THE INVENTION

Diversity reception radio receivers are well known in the art. Such receivers have been used to substantially improve radio reception in a changing multipath environment. Diversity receivers are particularly desirable in mobile and portable applications, in which a receiver may be moved into an isolated weak signal area caused by self-cancellation of multipath signals.

One conventional approach to a diversity receiver has comprised a dual antenna space-diversity system, the dual antennas coupled to a switch for selectively coupling one of the dual antennas to a single receiver. During operation the receiver is switched to an alternate antenna in response to a signal received from a currently selected antenna deteriorating below a predetermined switching threshold. This approach has a drawback in that the approach does not always select the antenna having the stronger signal. For example, a currently selected antenna having a signal marginally above the predetermined switching threshold would remain selected, even though a signal from a non-selected antenna is much stronger.

Another conventional approach to the diversity receiver has comprised a dual space-diversity antenna system separately coupled to dual receiver elements for amplifying and demodulating a radio signal received by the dual antennas. Such receivers have typically utilized an electronic switch to select the "best" output signal from one of the dual receiver elements based upon a measurable selection criterion, such as signal-to-noise ratio. Unfortunately, some conventional output signal selection techniques have been slow to respond, possibly causing loss of received information. Also, while the dual receiver approach to diversity reception has provided performance superior to the single receiver approach, it has typically been a power-hungry approach. This is because the dual receiver approach obviously has required double the amount of receiver circuitry and thus double the power of the single receiver approach. Power requirements are an especially important design consideration in battery powered portable receivers, such as selective call receivers, thereby limiting the widespread use of the conventional dual-receiver diversity approach for such applications.

Thus, what is needed is a way of building a diversity receiver that provides the superior performance of the dual receiver approach but does not require double the amount of power compared to the single receiver approach. A diversity receiver is needed that can switch to a better signal source quickly enough to avoid missing any received information.

SUMMARY OF THE INVENTION

One aspect of the present invention is a method of diversity reception in a data communication receiver comprising a first antenna feed coupled to a first receiver element for demodulating a radio signal comprising a plurality of data bits and for deriving a first phase-locked loop error signal therefrom. The data communication receiver further comprises a second antenna feed coupled to a second receiver element for demodulating the radio signal and for deriving a second phase-locked loop error signal therefrom. The method comprises the steps of:

(a) measuring a first signal strength of the radio signal from the first antenna feed during reception of a data bit;

(b) measuring a second signal strength of the radio signal from the second antenna feed during reception of the data bit;

(c) selecting the first phase-locked loop error signal to control generation of a common local oscillator signal when the first signal strength is equal to or greater than the second signal strength; and (d) selecting the second phase-locked loop error signal to control generation of the common local oscillator signal when the first signal strength is less than the second signal strength.

Another aspect of the present invention is a data communication receiver for providing diversity reception of a radio signal comprising data bits. The data communication receiver comprises first and second antenna feeds having substantially de-correlated sensitivity to the radio signal. The data communication receiver further comprises a first receiver element coupled to the first antenna feed for deriving a first phase-locked loop error signal from the radio signal, and a second receiver element coupled to the second antenna feed for deriving a second phase-locked loop error signal from the radio signal. The data communication receiver further comprises a switch element coupled to the first and second receiver elements for switching between the first and second phase-locked loop error signals to select a transitory error signal for the data communication receiver. The data communication receiver further comprises a common local oscillator coupled to the first and second receiver elements and coupled to the switch element for receiving the transitory error signal to control a carrier signal generated by the common local oscillator and provided to the first and second receiver elements.

Another aspect of the present invention is a selective call receiver for providing diversity reception of a radio signal containing data bits. The selective call receiver comprises a data communication diversity receiver. The data communication diversity receiver comprises an antenna element having first and second antenna feeds exhibiting substantially de-correlated sensitivity to the radio signal, and a first receiver element coupled to the first antenna feed for deriving a first phase-locked loop error signal from the radio signal and for demodulating the radio signal to derive the data bits contained therein. The data communication diversity receiver further comprises a second receiver element coupled to the second antenna feed for deriving a second phase-locked loop error signal from the radio signal and for demodulating the radio signal to derive the data bits contained therein. The data communication diversity receiver also includes a switch element coupled to the first and second receiver elements for switching between the first and second phase-locked loop error signals to select a transitory error signal for the selective call receiver. In addition, the data communication diversity receiver includes a common local oscillator coupled to the first and second receiver elements and coupled to the switch element for receiving the transitory error signal to control a carrier signal generated by the common local oscillator and provided to the first and second receiver elements. The selective call receiver further comprises a decoder coupled to the data communication diversity receiver for decoding an address sent in the radio signal, and a processor coupled to the decoder and coupled to the data communication diversity receiver for processing the data bits received in the radio signal to derive address and message information therefrom. The selective call receiver further comprises a display coupled to the processor for displaying the message information derived therein, and a memory coupled to the processor for storing the received data bits. The selective call receiver also includes an alert generator coupled to the processor for generating an alert in response to receiving the message.

BRIEF DESCRIPTION OF THE DRAWINGS

FIG. 4 is an electrical block diagram of a selective call receiver comprising the data communication diversity receiver in accordance with the preferred embodiment of the present invention.

DESCRIPTION OF THE PREFERRED EMBODIMENT

Figure 1:
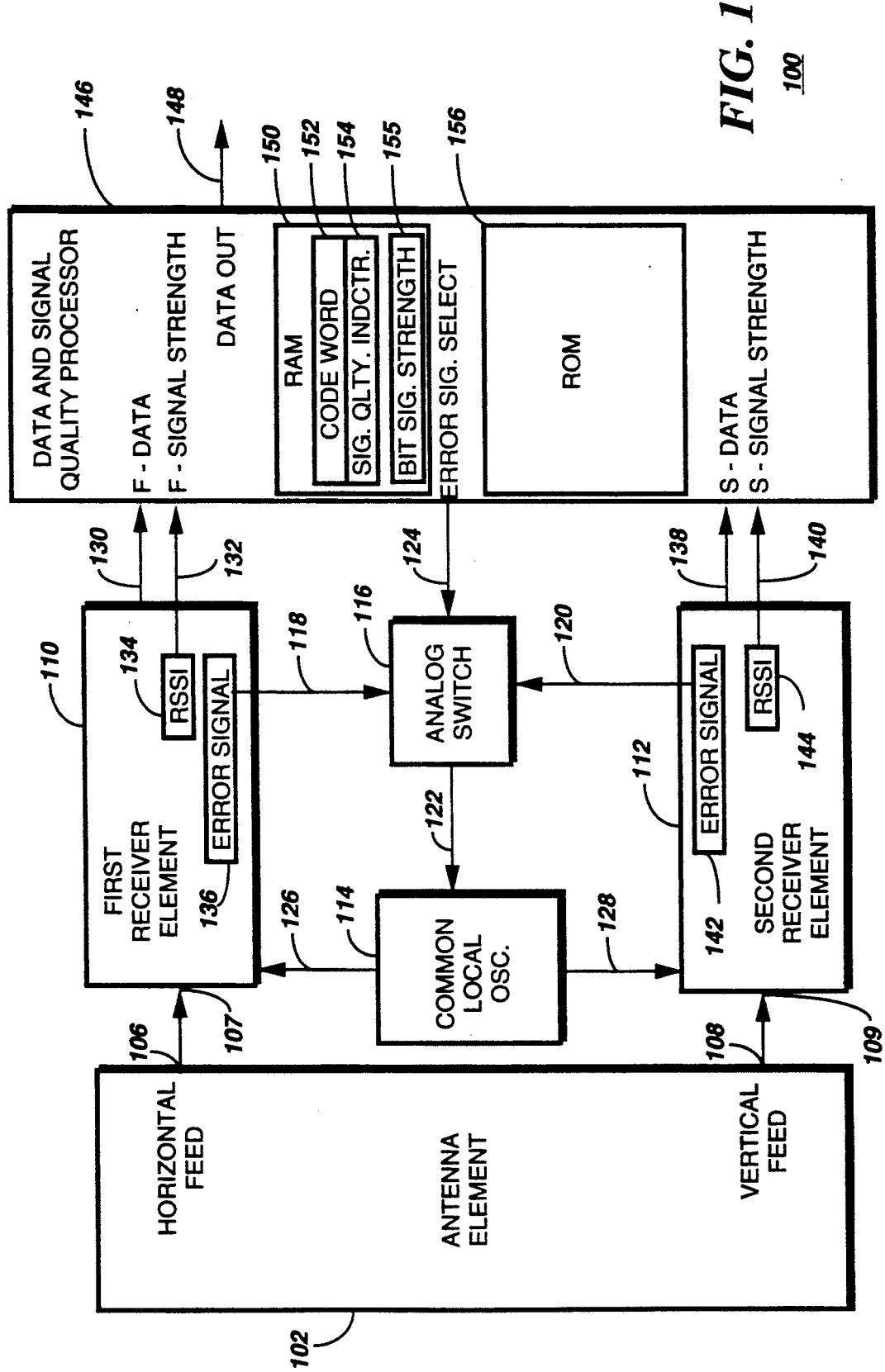
FIG. 1 is an electrical block diagram of a data communication diversity receiver in accordance with the preferred embodiment of the present invention.

Referring to FIG. 1, an electrical block diagram of a data communication diversity receiver 100 in accordance with the preferred embodiment of the present invention comprises an antenna element 102 having a horizontally polarized feed 106 and a vertically polarized feed 108. The horizontally polarized feed 106 is coupled to a first radio frequency (RF) input 107 of a first receiver element 110, while the vertically polarized feed 108 is coupled to a second RF input 109 of a second receiver element 112. The first and second receiver elements 110, 112 are conventional linear baseband homodyne receivers, which are well known in the art. The first and second receiver elements 110, 112 utilize well-known Costas phase-locked loop technology to demodulate a binary phase shift keyed (BPSK) received signal and to produce first and second error signals. The first and second error signals are coupled through an analog switch 116 shared between the first and second receiver elements 110 and 112 to control a common local oscillator 114 in accordance with the present invention. When the first error signal is coupled to the common local oscillator (114) by the analog switch (116), the first receiver element (110), the analog switch (116), and the common local oscillator (114) form a first phase-locked loop of the Costas type. When the second error signal is coupled to the common local oscillator (114) by the analog switch (116), the second receiver element (112), the analog switch (116), and the common local oscillator (114) form a second phase-locked loop of the Costas type. For further information on the Costas phase-locked loop, one is referred to *Digital and Analog Communication Systems*, Second Edition, by Leon W. Couch II, Pages 267–268, Published by Macmillan Publishing Company, New York, N.Y.

An output signal of the common local oscillator 114 is coupled to the first and second receiver elements 110, 112 by first and second oscillator output lines 126, 128, respectively. The first receiver element 110 comprises a first received signal strength indicator (RSSI) element 134 for indicating a first received signal strength, and a first phase-locked loop error signal element 136 for controlling the common local oscillator 114 when coupled thereto by the analog switch 116. The second receiver element 112 comprises a second received signal strength indicator (RSSI) element 144 for indicating a second received signal strength, and a second phase-locked loop error signal element 142 for controlling the common local oscillator 114 when coupled thereto by the analog switch 116. The first and second phase-locked loop error signal elements 136, 142 are coupled to the analog switch 116 by first and second error signal lines 118, 120. The analog switch 116 selects an error signal from either the first error signal line 118 or the second error signal line 120 under control of a data and signal quality processor 146 through an error signal select line 124. The analog switch 116 couples the selected error signal to the common local oscillator 114 by a switch output line 122.

The data and signal quality processor 146 is preferably an MC68HC11A1 microcontroller. The common local oscillator 114 is preferably a TTD1732A voltage controlled oscillator The analog switch 116 is preferably an MC74HC4053 analog multiplexer/demultiplexer. All the devices listed above are available from Motorola, Inc. of Schaumburg, Ill. It will be appreciated that other similar devices may be used instead without departing from the intent of the present invention.

The data and signal quality processor 146 is coupled to the first and second receiver elements 110, 112, respectively, by first and second data lines 130, 138 and by first and second signal strength lines 132, 140 for providing input information to the data and signal quality processor 146. The data and signal quality processor 146 comprises a Random Access Memory (RAM) 150 for temporary storage of the input information. The RAM 150 comprises a code word location 152 for storing received data bits, and a signal quality indicator location 154 for storing signal quality indicator values corresponding to the received data bits. The RAM 150 also includes a bit signal strength location 155 for temporarily storing an RSSI value before reducing the RSSI value to a signal quality indicator value. The data and signal quality processor 146 further comprises a data output line 148 for coupling output data to external circuitry (not shown in FIG. 1), and a read-only memory (ROM) 156 for storing executable firmware for controlling operation of the data communication diversity receiver 100.

Because a local oscillator that generates significant levels of harmonic energy can severely compromise receiver operation, the local oscillator must operate with high linearity. The requirement of high linearity necessitates that a local oscillator be designed to draw a higher supply current than otherwise would be necessary. Because local oscillator power can represent a significant fraction of the total power required for the receiver, the ability to use the single common local oscillator 114 to provide a carrier signal for the first and second receiver elements 110, 112 is a significant advantage provided by the present invention.

Figure 2:
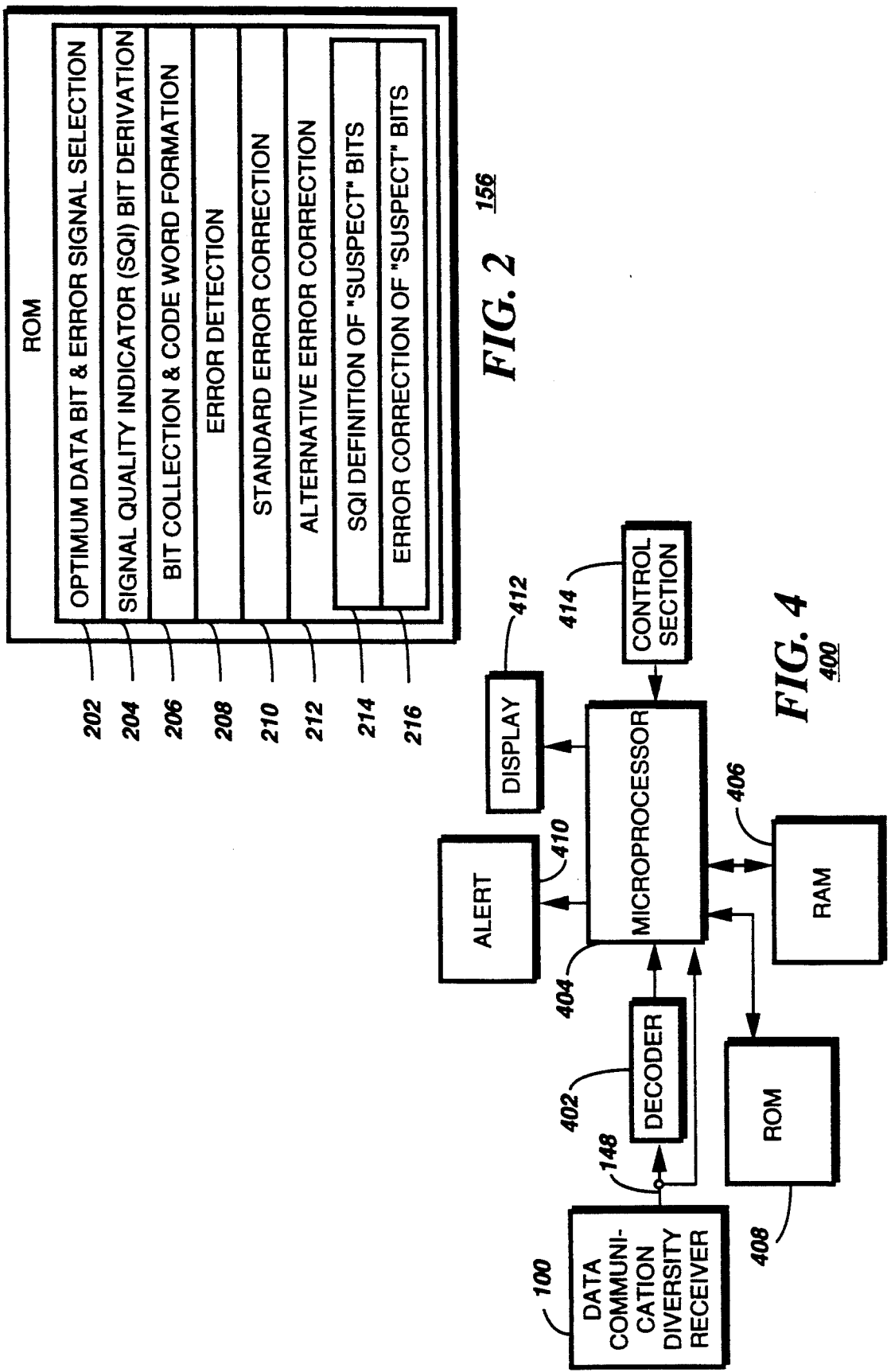
FIG. 2 is a block diagram detailing firmware elements in a ROM for controlling the data communication diversity receiver in accordance with the preferred embodiment of the present invention.

With reference to FIG. 2, a block diagram detailing firmware elements in the ROM 156 for controlling the data communication diversity receiver 100 in accordance with the preferred embodiment of the present invention comprises Optimum Data Bit And Error Signal Selection Firmware 202. The Optimum Data Bit And Error Signal Selection Firmware 202 selects and stores as an optimum data bit a bit as demodulated by either the first receiver element 110 (FIG. 1) or the second receiver element 112 (FIG. 1), whichever one measured a higher signal strength during reception of the bit. The Optimum Data Bit And Error Signal Selection Firmware 202 also selects a corresponding optimum error signal to control the common local oscillator 114 during reception of a next data bit. Signal Quality Indicator (SQI) Bit Derivation Firmware 204 assigns either a one or zero value to a SQI bit, the value dependent upon signal strength relative to a predetermined level during reception of a corresponding data bit. Bit Collection And Code Word Formation Firmware 206 collects optimum data bits and corresponding SQI bits to form a data code word and a corresponding SQI word for use in an error correction algorithm as described herein below.

Error Detection Firmware 208 counts bit errors in the data code word and determines whether the data code word contains too many bit errors for the error correction algorithm to correct. Standard Error Correction Firmware 210 corrects the bit errors in the data code word if there are not too many bit errors. If there are too many bit errors for the Standard Error Correction Firmware 210 to correct, Alternative Error Correction Firmware 212 attempts to correct the bit errors by first utilizing SQI Definition Of "Suspect" Bits Firmware 214 to define as "suspect" any data bit having a corresponding SQI bit that indicates a signal strength below a predetermined level during reception of the data bit. Next, the Alternative Error Correction Firmware 212 utilizes Error Correction Of "Suspect" Bits Firmware 216 to correct the bit errors in the remaining bits defined by the SQI Definition Of "Suspect" Bits Firmware 214 to be correct.

Figure 3:
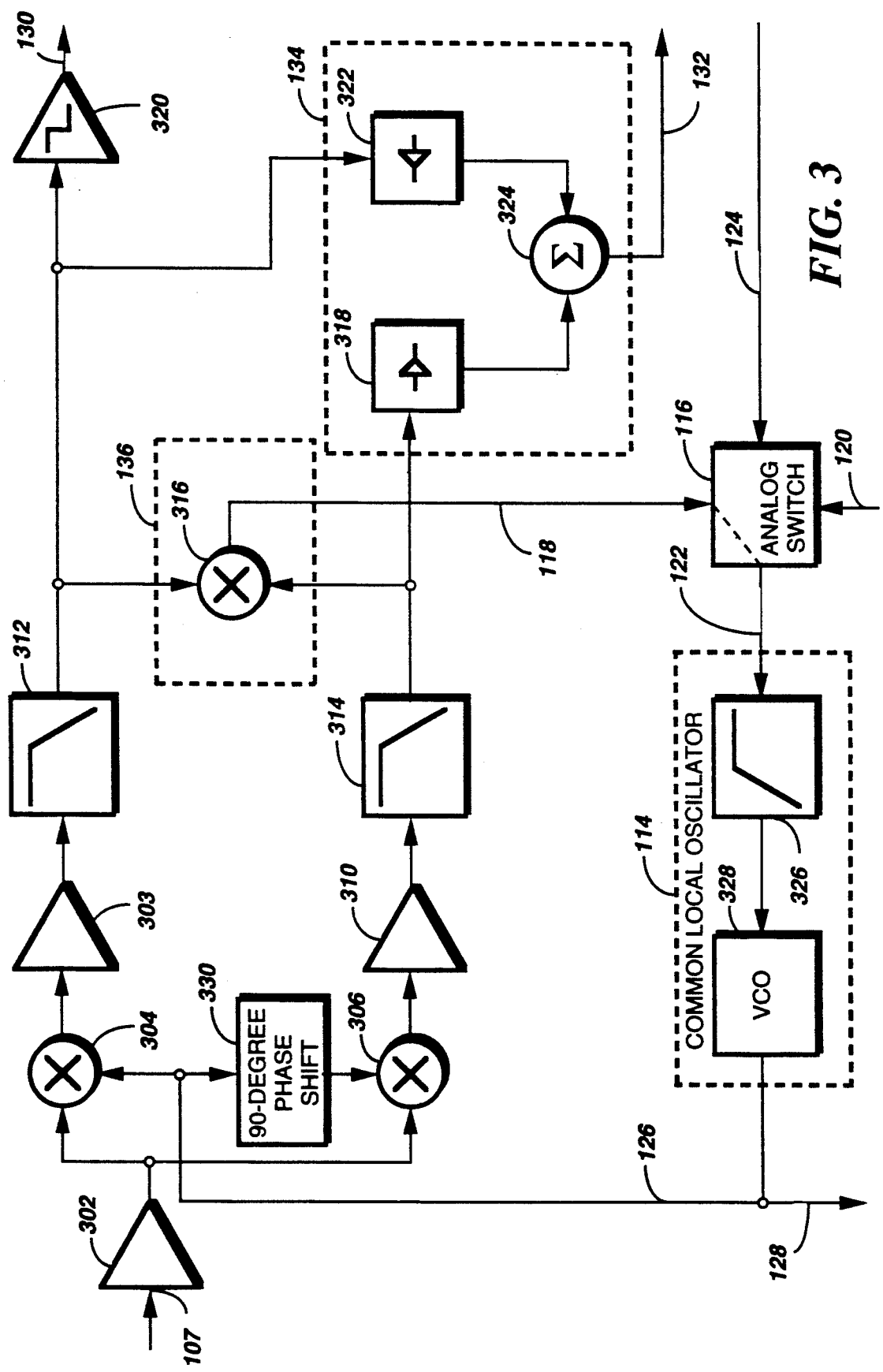
FIG. 3 is an electrical block diagram of a Costas phase-locked loop used in a first receiver element of the data communication diversity receiver in accordance with the preferred embodiment of the present invention.

With reference to FIG. 3, an electrical block diagram of a Costas phase-locked loop used in the first receiver element 110 of the data communication diversity receiver 100 (FIG. 1) in accordance with the preferred embodiment of the present invention includes a first radio frequency (RF) amplifier 302 comprising the first RF input 107. The first RF input 107 is for receiving a double-sideband carrier radio signal comprising binary phase shift keyed (BPSK) data. The first RF amplifier 302 is coupled to first inputs of first and second multipliers 304, 306. The output of the first multiplier 304 is coupled to the input of a second RF amplifier 303 whose output is coupled to the input of a first low-pass filter 312. The output of the first low-pass filter 312 is coupled to a first input of a third multiplier 316 comprising the first phase-locked loop error signal element 136. The output of the first low-pass filter 312 is also coupled to the input of a limiter element 320 and to the input of a first square law element 322 of the first received signal strength indicator (RSSI) element 134. The output signal from the limiter element 320 is coupled to the first data line 130.

The output of the second multiplier 306 is coupled to the input of a third RF amplifier 310 whose output is coupled to the input of a second low-pass filter 314. The output of the second low-pass filter 314 is coupled to a second input of the third multiplier 316 and to the input of a second square law element 318. The first and second square law elements 322, 318 are coupled to a summer 324 whose output is coupled to the first signal strength line 132.

The output of the third multiplier 316 is coupled to the analog switch 116 by the first error signal line 118. The analog switch 116 selectively couples the switch output line 122 to either the first error signal line 118 or the second error signal line 120, depending on the state of a signal from the data and signal quality processor 146 (FIG. 1) on the error signal select line 124. The switch output line 122 is coupled to the input of a third low-pass filter 326 of the common local oscillator 114. The output of the third low-pass filter 326 is coupled to the control input of a voltage controlled oscillator (VCO) 328. The output of the VCO 328 is coupled to the first and second oscillator output lines 126, 128 for supplying a carrier signal to the first and second receiver elements 110, 112 (FIG. 1). The first oscillator output line 126 is coupled to a second input of the first multiplier 304 and to the input of a ninety-degree phase shift element 330. The output of the ninety-degree phase shift element 330 is coupled to a second input of the second multiplier 306.

The first, second, and third multipliers 304, 306, and 316 are preferably MC1496 balanced modulator/demodulator circuits. The first and second square law elements 322, 318 are preferably the MC1495 series of multipliers. Both the MC1496 and the MC1495 devices are available from Motorola, Inc. of Schaumburg, Ill. Other similar devices may be substituted without departing from the intent of the present invention.

The summer 324 is preferably a resistor coupled between circuit ground and the current outputs of the first and second square law elements 322, 318 for producing a voltage proportional to the sum of the output currents. The first, second, and third RF amplifiers 302, 303, 310, the limiter element 320, the first, second, and third low-pass filters 312, 314, 326, and the ninety-degree phase shift element 330 are all well known to one of ordinary skill in the art.

Operation of the Costas phase-locked loop is such that when the analog switch 116 couples an error signal from the third multiplier 316 to the common local oscillator 114, the common local oscillator 114 produces an output signal that is frequency and phase locked to the double sideband carrier received at the first RF input 107. Furthermore, the output signal from the limiter element 320 coupled to the first data line 130 is the received, demodulated BPSK data. For further information on the Costas phase-locked loop, one is referred to *Digital and Analog Communication Systems*, Second Edition, by Leon W. Couch II, Pages 267–268, Published by Macmillan Publishing Company, New York, N.Y.

With reference to FIG. 4, an electrical block diagram of a selective call receiver 400 comprising the data communication diversity receiver 100 (FIG. 1) in accordance with the preferred embodiment of the present invention includes a decoder 402 coupled to the data output line 148 (FIG. 1) of the data communication diversity receiver 100 for decoding received address information. Also coupled to the data output line 148 is a microprocessor 404 for processing a received message. The microprocessor 404 is preferably a MC68HCL05C8 microcontroller available from Motorola, Inc. of Schaumburg, Ill. It will be appreciated that the function of the decoder 402 may be handled by the microprocessor 404 in a manner well known in the art. The microprocessor 404 is coupled to a random access memory (RAM) 406 for storing the received message. The microprocessor 404 is also coupled to a read-only memory (ROM) 408 for storing executable operating system firmware. It also will be appreciated that the RAM 406 and the ROM 408 may be manufactured as a contiguous part of the microprocessor 404. Also coupled to the microprocessor 404 is an alert generator 410 for generating an audible or tactile alert in response to the received message. Further, there is a display 412, e.g., a liquid crystal display, coupled to the microprocessor 404 for displaying the received message. A control section 414 is also coupled to the microprocessor 404 for providing user controls, e.g., well-known buttons and knobs, to allow a user to control operation of the selective call receiver 400.

As described herein above, the data communication diversity receiver 100 (FIG. 1) in accordance with the preferred embodiment of the present invention utilizes the data and signal quality processor 146 (FIG. 1) to provide all processing required by the data communication diversity receiver 100. Still, it will be appreciated that the microprocessor 404 could be used as well to provide all the processing required by the data communication diversity receiver 100 and all other peripheral components of the selective call receiver 400 without departing from the intent of the present invention. The microprocessor 404 could provide all the processing, for example, in an application in which received data bit rate is below a level that requires the speed of an independent processor like the data and signal quality processor 146 dedicated to the data communication diversity receiver 100.

Figure 5:
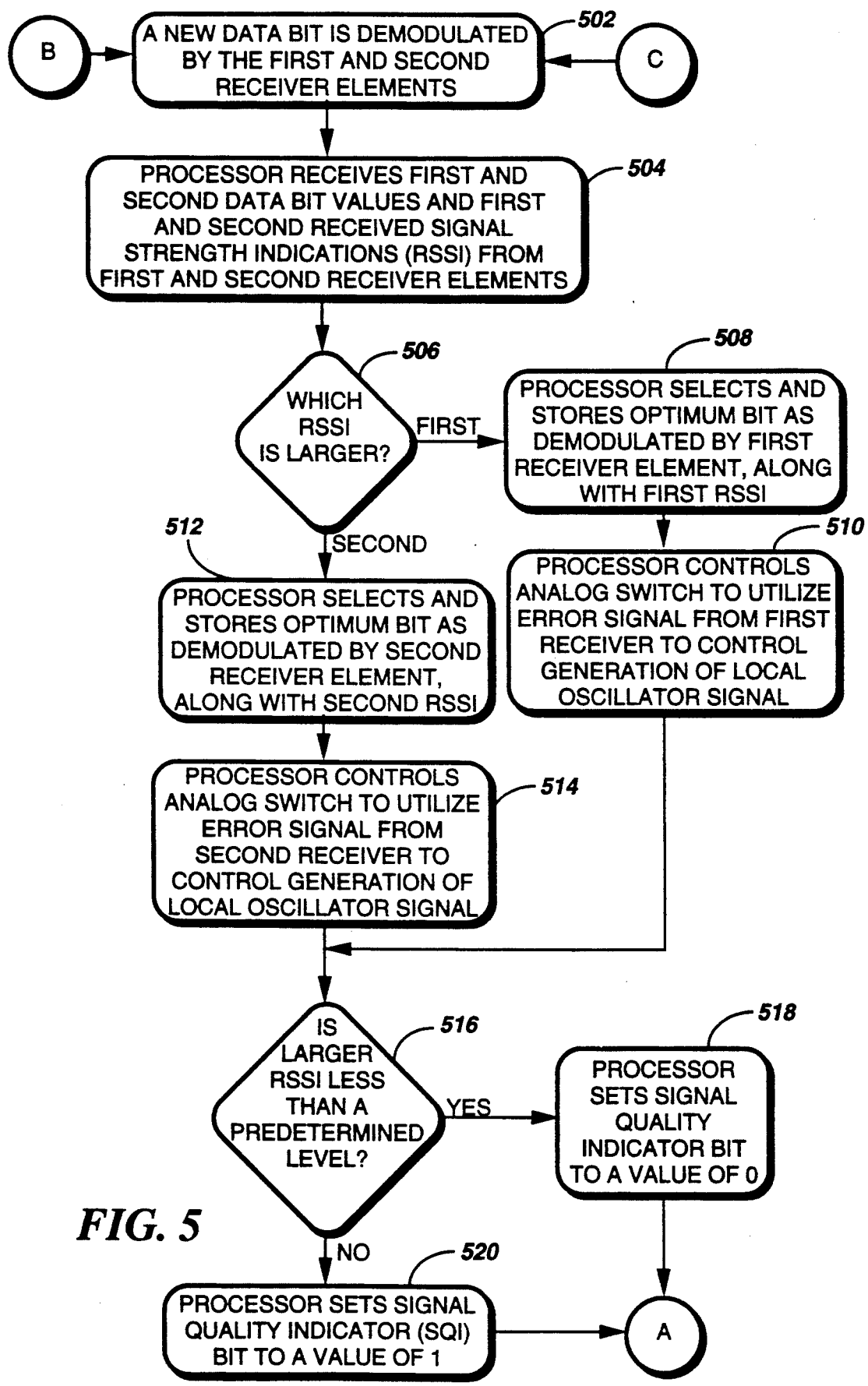
FIG. 5 is a flow chart of a method of diversity reception in the data communication diversity receiver in accordance with the preferred embodiment of the present invention.
Figure 6:
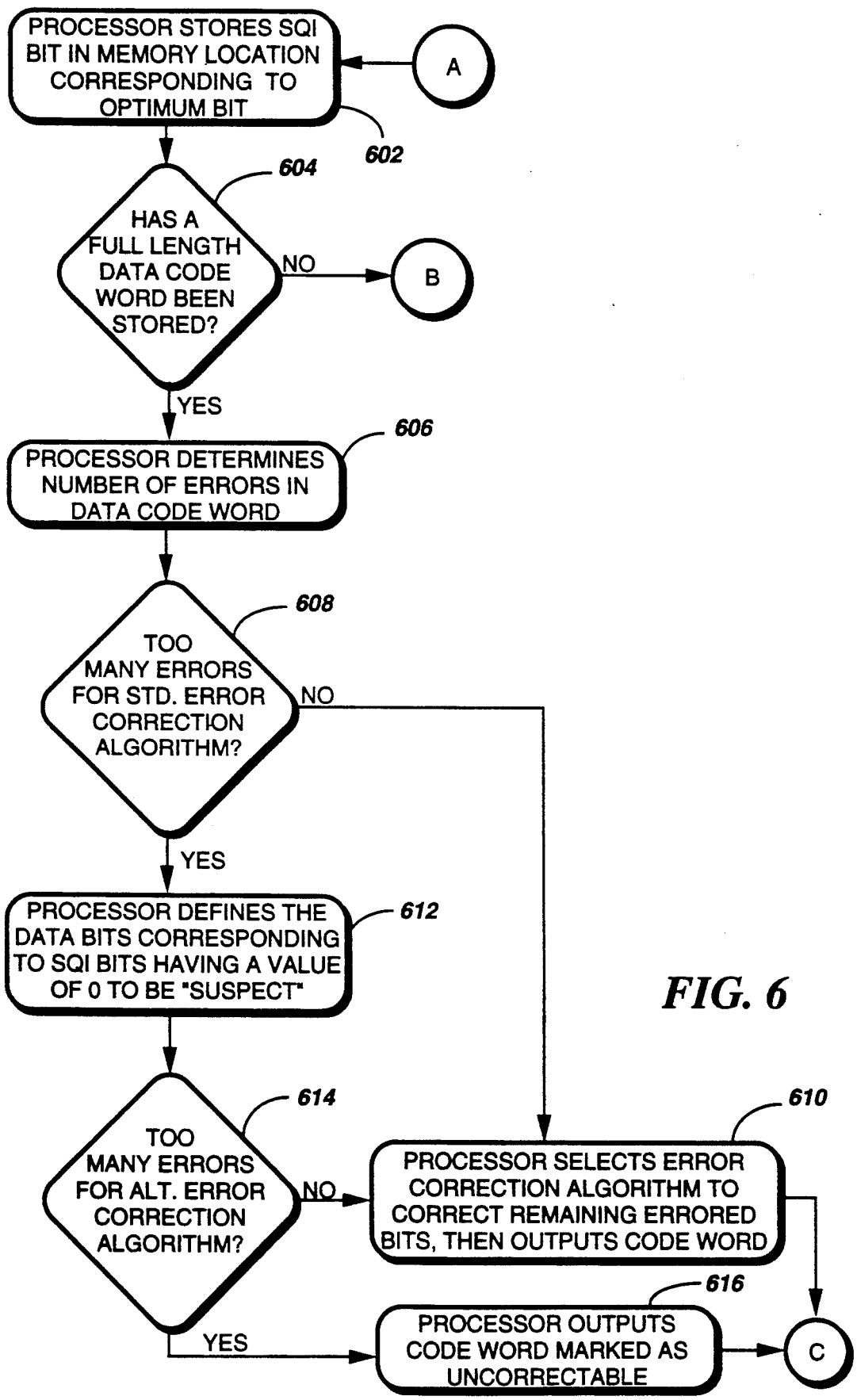
FIG. 6 is a continuation of the flow chart of the method of diversity reception in the data communication diversity receiver in accordance with the preferred embodiment of the present invention.

With reference to FIGS. 5 and 6, a flow chart of a method of diversity reception in the data communication receiver in accordance with the preferred embodiment of the present invention begins with the demodulation 502 of a new received data bit. First, the data and signal quality processor 146 (FIG. 1) accesses the Optimum Data Bit And Error Signal Selection Firmware 202 (FIG. 2) to select and store an optimum data bit and to select a corresponding optimum error signal, as described herein below. For each received data bit, the data and signal quality processor 146 receives 504 a first data bit value of the received data bit as demodulated by the first receiver element 110 (FIG. 1) and a corresponding first signal strength value measured by the first RSSI element 134 during reception of the data bit.

The first data bit value and the first signal strength value are sent over the first data line 130 (FIG. 1) and the first signal strength line 132 (FIG. 1), respectively. For each received data bit, the data and signal quality processor 146 also receives 504 a second data bit value of the received data bit as demodulated by the second receiver element 112 (FIG. 1) and a corresponding second signal strength value measured by the second RSSI element 144 during reception of the data bit from the second receiver element 112. The second data bit value and the second signal strength value are sent over the second data line 138 (FIG. 1) and the second signal strength line 140 (FIG. 1), respectively.

In step 506 the data and signal quality processor 146 (FIG. 1) determines the larger of the first and second signal strength values. If the larger signal strength value is the first signal strength value, the data and signal quality processor 146 accesses the Bit Collection And Code Word Formation Firmware 206 (FIG. 2). The data and signal quality processor 146 then stores 508 the first data bit value as the optimum data bit value in the code word location 152 (FIG. 1) of the random access memory (RAM) 150 (FIG. 1). The bit position used to store the optimum bit is the lowest order bit position currently not being used for storing another optimum bit of the code word. The data and signal quality processor 146 also stores temporarily in the bit signal strength location 155 (FIG. 1) in the RAM 150 the first received signal strength value. In addition, the data and signal quality processor 146 controls 510 the analog switch 116 (FIG. 1) to utilize the error signal on the first error signal line 118 (FIG. 1) to control the common local oscillator 114 (FIG. 1) during reception of a next data bit, and then flow moves to step 516.

If, on the other hand in step 506 the data and signal quality processor 146 (FIG. 1) determines that the larger signal strength value is the second signal strength value, the data and signal quality processor 146 accesses the Bit Collection And Code Word Formation Firmware 206 (FIG. 2). The data and signal quality processor 146 then stores 512 the second data bit value as the optimum data bit value in the code word location 152 (FIG. 1) in the random access memory (RAM) 150 (FIG. 1). The bit position used to store the optimum bit is the lowest order bit position currently not being used for storing another optimum bit of the code word. The data and signal quality processor 146 also stores temporarily in the bit signal strength location 155 (FIG. 1) in the RAM 150 the second received signal strength value. In addition, the data and signal quality processor 146 controls 514 the analog switch 116 (FIG. 1) to utilize the error signal on the second error signal line 120 (FIG. 1) to control the common local oscillator 114 (FIG. 1) during reception of the next data bit, and then flow moves to step 516.

Next, the data and signal quality processor 146 (FIG. 1) accesses the SQI Bit Derivation Firmware 204 (FIG. 2). In step 516 the data and signal quality processor 146 determines whether the larger of the first and second receiver signal strength values is below a predetermined value. If so, the data and signal quality processor 146 sets 518 an SQI bit corresponding to the received data bit to a value of zero. If not, the data and signal quality processor 146 sets 520 the SQI bit corresponding to the received data bit to a value of one.

The data and signal quality processor 146 again accesses the Bit Collection And Code Word Formation Firmware 206 (FIG. 2) and stores 602 (FIG. 6) the value set for the SQI bit in either step 518 or 520 in the bit position in the SQI location 154 (FIG. 1) corresponding to the bit position used to store the optimum data bit in step 508 or step 512. In step 604 the data and signal quality processor 146 (FIG. 1) checks whether the stored optimum data bit represents a last bit required to complete a data code word of full length. If not, the flow returns to step 502 (FIG. 5) to await demodulation of another data bit. If, however, in step 604 the data and signal quality processor 146 determines that a data code word of full length has now been stored, then the data and signal quality processor 146 accesses the Error Detection Firmware 208 and determines 606 the number of errors in the data code word. If in step 608 the data and signal quality processor 146 determines that there are not too many errors for the Standard Error Correction Firmware 210 (FIG. 2) to correct, then the data and signal quality processor 146 accesses 610 the Standard Error Correction Firmware 210 to correct errored data bits in the code word. Next, the data and signal quality processor 146 outputs 610 the corrected code word on the data output line 148 (FIG. 1) for further processing by the decoder 402 and the microprocessor 404 (FIG. 4), and flow returns to step 502 (FIG. 5) to await the demodulation of another data bit.

If, on the other hand, in step 608 the data and signal quality processor 146 (FIG. 1) determines that there are too many errors for the Standard Error Correction Firmware 210 (FIG. 2) to correct, then the data and signal quality processor 146 accesses the Alternative Error Correction Firmware 212 (FIG. 2) to correct errored data bits in the code word. Next, the data and signal quality processor 146 defines 612 as "suspect" the data bits corresponding to SQI bits having a value of zero. Considering the data bits now defined to be "suspect" the data and signal quality processor 146 then determines 614 whether there are still potentially too many errored bits remaining for the Alternative Error Correction Firmware 212 to correct. If not, then the data and signal quality processor 146 utilizes 610 the Alternative Error Correction Firmware 212 to correct the "suspect" bits in the code word. Next, the data and signal quality processor 146 outputs 610 the corrected code word on the data output line 148 (FIG. 1) for further processing by the decoder 402 and the microprocessor 404 (FIG. 4), and flow returns to step 502 (FIG. 5) to await the demodulation of a new data bit.

The Alternative Error Correction Firmware 212 comprises an error correction algorithm such as the Viterbi algorithm. The Viterbi algorithm is well-known by those of ordinary skill in the art of error-correcting communication coding. The Viterbi algorithm treats the "suspect" bits as neither ones or zeroes, but as erased, i.e., unknown, bit values. Because the bit positions of the "suspect" bits are known, the Alternative Error Correction Firmware 212 can correct at least one additional bit error per code word than is possible with the Standard Error Correction Firmware 210.

If, on the other hand, in step 614 the data and signal quality processor 146 (FIG. 1) determines that there are still too many errored bits remaining in the code word for the Alternative Error Correction Firmware 212 (FIG. 2) to correct, then the data and signal quality processor 146 outputs 616 the code word on the data output line 148 (FIG. 1) with a unique bit pattern to "mark" the code word as uncorrectable. Flow then returns to step 502 (FIG. 5) to await the demodulation of a new data bit.

Figure 7:
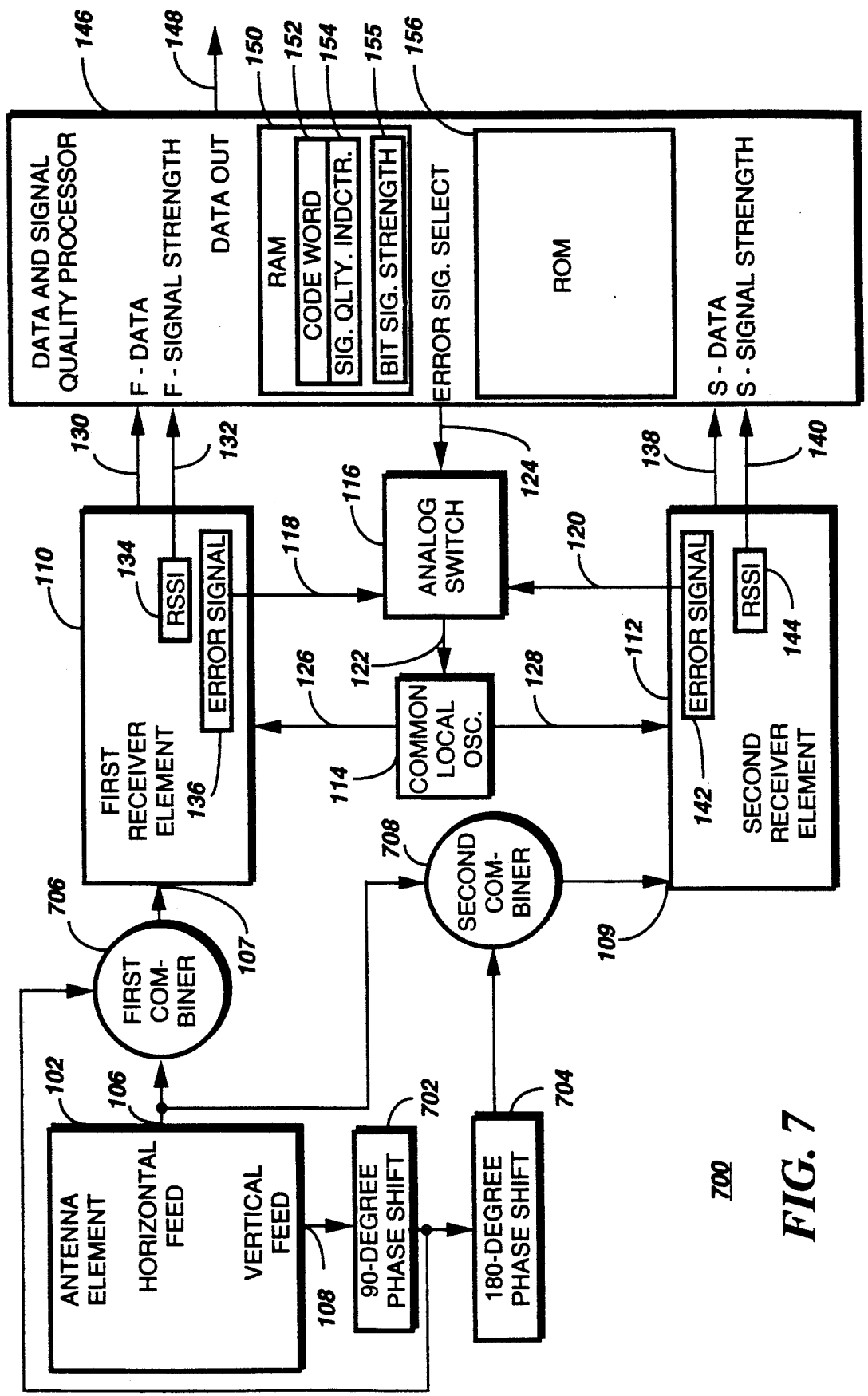
FIG. 7 is an electrical block diagram of a data communication diversity receiver in accordance with a first alternate embodiment of the present invention.

With reference to FIG. 7, an electrical block diagram of a data communication diversity receiver 700 in accordance with a first alternate embodiment of the present invention is depicted. The essential difference between the data communication diversity receiver 700 and the data communication diversity receiver 100 (FIG. 1) comprises added elements including a ninety-degree phase shift element 702 coupled to the vertically polarized feed 108 of the antenna element 102, and a one-hundred-eighty-degree phase shift element 704 coupled to the output of the ninety-degree phase shift element 702. The added elements further include a first combiner 706 coupled to the output of the ninety-degree phase shift element 702 and to the horizontally polarized feed 106 of the antenna element 102 for combining signals supplied therefrom. The added elements further include a second combiner 708 coupled to the output of the one-hundred-eighty-degree phase shift element 704 and to the horizontally polarized feed 106 of the antenna element 102 for combining signals supplied therefrom. The output of the first combiner 706 is coupled to the first RF input 107 of the first receiver element 110, and the output of the second combiner 708 is coupled to the second RF input 109 of the second receiver element 112.

A first effect of the added elements 702, 704, 706, 708 coupled as described herein above is to supply to the first RF input 107 from the antenna element 102 a first antenna feed signal that has a maximum sensitivity to a radio signal having a substantially clockwise circular E-field polarization about an axis. A second effect of the added elements 702, 704, 706, 708 coupled as described herein above is to supply to the second RF input 109 from the antenna element 102 a second antenna feed signal that has a maximum sensitivity to a radio signal having a substantially counter-clockwise circular E-field polarization about the same axis. This embodiment of the present invention is particularly advantageous for applications that utilize circularly polarized transmitting antennas, e.g., satellite applications.

Figure 8:
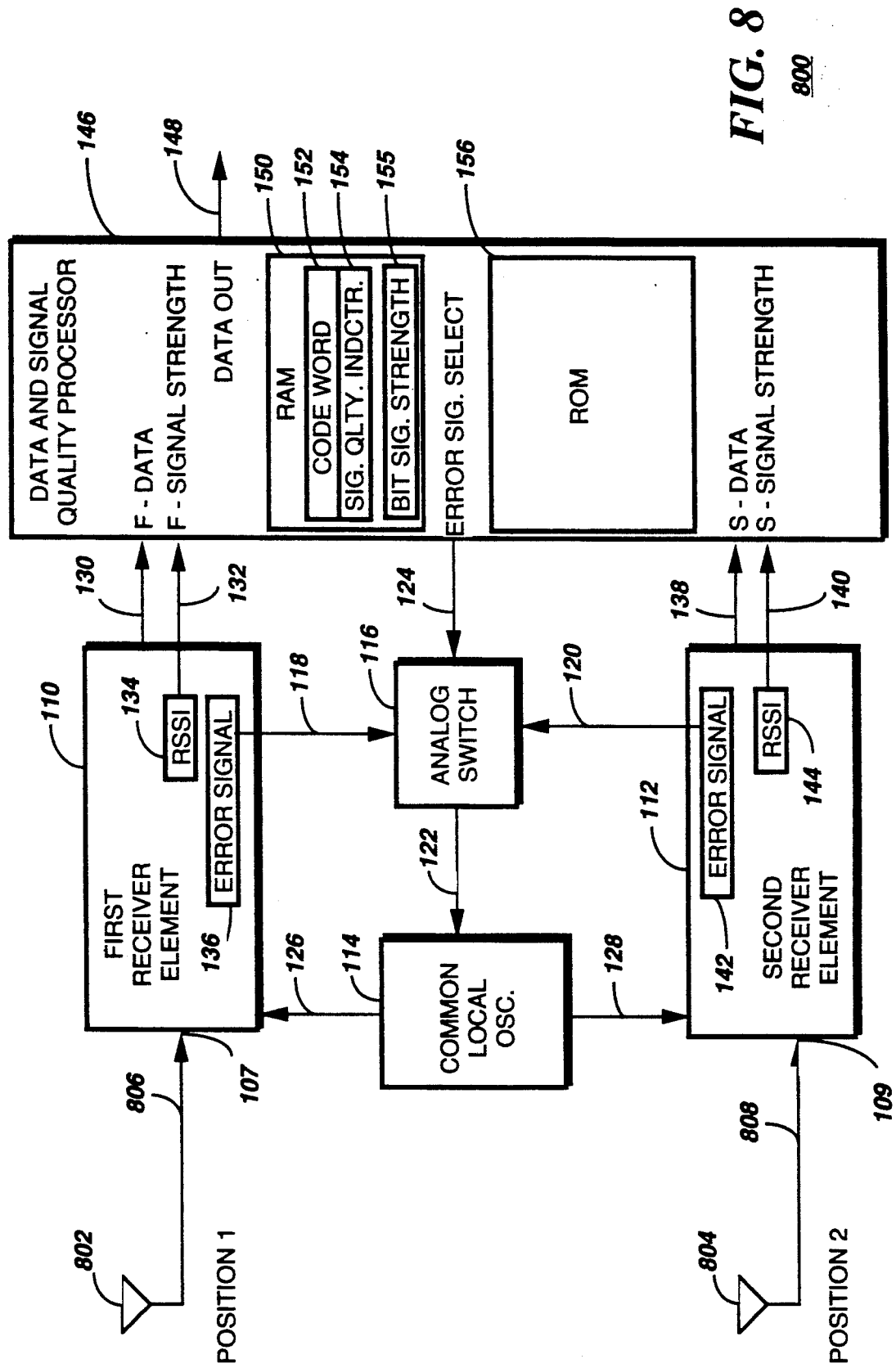
FIG. 8 is an electrical block diagram of a data communication diversity receiver in accordance with a second alternate embodiment of the present invention.

With reference to FIG. 8, an electrical block diagram of a data communication diversity receiver 800 in accordance with a second alternate embodiment of the present invention is depicted. The essential difference between the data communication diversity receiver 800 and the data communication diversity receiver 100 (FIG. 1) is that the data communication diversity receiver 800 utilizes a first antenna 802 having a first antenna feed 806 coupled to the first RF input 107, and a second antenna 804 having a second antenna feed 808 coupled to the second RF input 109. The first and second antennas 802, 804 are positioned in different locations to achieve a space-diversity reception. By comparison, the data communication diversity receiver 100 utilizes the single antenna element 102 (FIG. 1) having the horizontally polarized feed 106 and the vertically polarized feed 108 to achieve polarization-diversity reception. The embodiment depicted in FIG. 8 is particularly advantageous for applications in which it is possible to separate adequately the first and second antennas 802, 804, e.g., mobile radio systems for use in motor vehicles.

Thus, the present invention provides a way of building a data communication diversity receiver that achieves the superior performance of a dual receiver approach but that does not require double the amount of power compared to a single receiver approach. Because design constraints typically require a local oscillator to operate with high linearity, the power required for conventional dual local oscillators typically has represented a significant fraction of the total power required for a conventional dual channel diversity receiver. By utilizing a single common local oscillator selectively coupled to one of two phase-locked loop error signals from two receiver elements, the present invention eliminates the need for dual high-power local oscillators and thus reduces the required power to a level substantially closer to the power required by the single receiver approach.

In addition, by selecting each data bit as demodulated by the receiver element having the highest signal strength at the time of reception of the data bit, the present invention increases the probability that the data bit has been demodulated correctly. Furthermore, by recording a signal quality indicator value corresponding to each demodulated data bit, the present invention achieves an enhanced level of error correction.

We claim:

1. A method of diversity reception in a data communication receiver comprising a first antenna feed coupled to a first receiver element for demodulating a radio signal containing data bits and for deriving a first phase-locked loop error signal from the radio signal, the data communication receiver further comprising a second antenna feed coupled to a second receiver element for demodulating the radio signal and for deriving a second phase-locked loop error signal from the radio signal, the method comprising the steps of:

(a) measuring a first signal strength of the radio signal from the first antenna feed during reception of a data bit;

(b) measuring a second signal strength of the radio signal from the second antenna feed during reception of the data bit;

(c) selecting the received data bit as demodulated by the first receiver element to be an optimum received data bit when the first signal strength is equal to or greater than the second signal strength;

(d) selecting the received data bit as demodulated by the second receiver element to be the optimum received data bit when the first signal strength is less than the second signal strength;

(e) selecting the first phase-locked loop error signal to control generation of a common local oscillator signal when the first signal strength is equal to or greater than the second signal strength; and (f) selecting the second phase-locked loop error signal to control generation of the common local oscillator signal when the first signal strength is less than the second signal strength.

2. The method in accordance with claim 1, further comprising the steps of:

(g) deriving a signal quality indicator bit corresponding to the optimum received data bit, comprising the steps of:

(h) setting the signal quality indicator bit to a first value, the greater of the first and second signal strengths being equal to or greater than a predetermined level during reception of the optimum received data bit, and (i) setting the signal quality indicator bit to a second value, the greater of the first and second signal strengths being less than the predetermined level during reception of the optimum received data bit;

(j) storing the signal quality indicator derived in step (g) along with the corresponding optimum received data bit; and (k) repeating steps (g), (h), (i), and (j) until a plurality of values of optimum received data bits and corresponding values of signal quality indicator bits are stored to form a data code word and a signal quality indicator word, respectively, each having a bit length defined by a predetermined error correcting code word format.

3. The method in accordance with claim 2, further comprising the steps of:

(l) determining whether or not errors in the values of the optimum received data bits exceed a predetermined number of bit errors that a first error correction algorithm can correct;

(m) processing the code word formed in step (k) in the first error correction algorithm to correct the errors in the values, it having been determined in step (l) that the errors do not exceed the predetermined number; and (n) alternatively processing the code word formed in step (k) along with the signal quality indicators corresponding to the bits thereof in a second error correction algorithm, it having been determined in step (l) that the errors exceed the predetermined number, the alternative processing comprising the steps of:

(o) defining selected values of the received data bits to be potentially erroneous, the corresponding signal quality indicators being set to the second value; and (p) applying the second error correction algorithm to correct potential errors in the selected values of the received data bits defined in step (o) to be potentially erroneous.

4. A data communication receiver for providing diversity reception of a radio signal containing data bits, the data communication receiver comprising:

first and second antenna feeds having substantially de-correlated sensitivity to the radio signal;

a first receiver element coupled to the first antenna feed for deriving a first phase-locked loop error signal from the radio signal;

a second receiver element coupled to the second antenna feed for deriving a second phase-locked loop error signal from the radio signal;

a switch element coupled to the first and second receiver elements for selecting between the first phase-locked loop error signal and the second phase-locked loop error signal as a transitory error signal for the data communication receiver; and a common local oscillator coupled to the first and second receiver elements and coupled to the switch element for receiving the transitory error signal to control a carrier signal generated by the common local oscillator and provided to the first and second receiver elements.

5. The data communication receiver of claim 4, wherein the first receiver element, the switch element, and the common local oscillator form a first phase-locked loop in response to the first phase-locked loop error signal being coupled to the common local oscillator by the switch element, and wherein the second receiver element, the switch element, and the common local oscillator form a second phase-locked loop in response to the second phase-locked loop error signal being coupled to the common local oscillator by the switch element.

6. The data communication receiver of claim 5, wherein the first and second phase-locked loops are of the Costas type.

7. The data communication receiver of claim 4, wherein the first antenna feed is maximally sensitive to a radio signal having a substantially horizontal E-field polarization, and
wherein the second antenna feed is maximally sensitive to a radio signal having a substantially vertical E-field polarization.

8. The data communication receiver of claim 4, wherein the first antenna feed is maximally sensitive to a radio signal having a substantially clockwise circular E-field polarization, and
wherein the second antenna feed is maximally sensitive to a radio signal having a substantially counter-clockwise circular E-field polarization.

9. The data communication receiver of claim 4, wherein the first antenna feed originates from a first antenna, and
wherein the second antenna feed originates from a second antenna, and
wherein the first and second antennas are positioned in different locations.

10. The data communication receiver in accordance with claim 4, further comprising:
a processor coupled to the first and second receiver elements and to the switch element for controlling the switch element to make an error signal selection for the source of the transitory error signal,
wherein the first receiver element comprises a first signal strength indicator element for indicating a first signal strength of the radio signal received from the first antenna feed, and
wherein the second receiver element comprises a second signal strength indicator element for indicating a second signal strength of the radio signal received from the second antenna feed, and
wherein the error signal selection comprises the first phase-locked loop error signal, the first signal strength being greater than or equal to the second signal strength, and
wherein the error signal selection comprises the second phase-locked loop error signal, the first signal strength being less than the second signal strength.

11. The data communication receiver in accordance with claim 10, further comprising:
a first processor element coupled to the first and second receiver elements for making an optimum data bit selection of a received data bit, the selected received data bit defined as an optimum data bit,
wherein the optimum data bit selection comprises the received data bit as received from the first antenna feed and demodulated by the first receiver element, the first signal strength being greater than or equal to the second signal strength, and
wherein the optimum data bit selection comprises the received data bit as received from the second antenna feed and demodulated by the second receiver element, the first signal strength being less than the second signal strength.

12. The data communication receiver of claim 11, further comprising:
a second processor element coupled to the first and second receiver elements for deriving and storing a signal quality indicator bit corresponding to the optimum data bit,
wherein the signal quality indicator bit comprises a first value, the larger of the first and second signal strengths being equal to or greater than a predetermined level during reception of the optimum data bit, and
wherein the signal quality indicator bit comprises a second value, the larger of the first and second signal strengths being less than the predetermined level during reception of the optimum data bit; and
a third processor element coupled to the second processor element for collecting a plurality of optimum data bits and corresponding signal quality indicator bits to form a data code word and a signal quality indicator word, respectively, each having a bit length defined by a predetermined error correcting code word format.

13. The data communication receiver of claim 12, further comprising:
a fourth processor element for determining whether or not errors in the code word exceed a predetermined limit for a first error correction algorithm;
a fifth processor element coupled to the fourth processor element for processing the code word by the first error correction algorithm, the errors not exceeding the predetermined limit; and
a sixth processor element coupled to the fourth processor element for alternatively processing the code word along with the signal quality indicators corresponding to the bits thereof by a second error correction algorithm, the errors exceeding the predetermined limit, wherein the sixth processor element comprises:
a seventh processor element for defining selected received data bits of the data code word to be potentially erroneous, the corresponding signal quality indicator bits being set to the second value; and
an eighth processor element coupled to the seventh processor element for applying the second error correction algorithm to correct potential errors in the selected received data bits of the code word defined by the seventh processor element to be potentially erroneous.

14. A selective call receiver for providing diversity reception of a radio signal containing data bits, the selective call receiver comprising:
a data communication diversity receiver, comprising:
an antenna element comprising first and second antenna feeds having substantially de-correlated sensitivity to the radio signal,
a first receiver element coupled to the first antenna feed for deriving a first phase-locked loop error signal from the radio signal and for demodulating the radio signal to derive the data bits contained therein,
a second receiver element coupled to the second antenna feed for deriving a second phase-locked loop error signal from the radio signal and for demodulating the radio signal to derive the data bits contained therein,
a switch element coupled to the first and second receiver elements for switching between the first and second phase-locked loop error signals to select a transitory error signal for the selective call receiver, and a common local oscillator coupled to the first and second receiver elements and coupled to the switch element for receiving the transitory error signal to control a carrier signal generated by the common local oscillator and provided to the first and second receiver elements;

a decoder coupled to the data communication diversity receiver for decoding an address sent in the radio signal;

a processor coupled to the decoder and coupled to data communication diversity receiver for processing the data bits received in the radio signal to derive address and message information therefrom;

a display coupled to the processor for displaying the message information derived therein;

a memory coupled to the processor for storing the received data bits; and an alert generator coupled to the processor for generating an alert in response to receiving the message.

15. The selective call receiver of claim 14,
wherein the first receiver element, the switch element, and the common local oscillator form a first phase-locked loop in response to the first phase-locked loop error signal being coupled to the common local oscillator by the switch element, and wherein the second receiver element, the switch element, and the common local oscillator form a second phase-locked loop in response to the second phase-locked loop error signal being coupled to the common local oscillator by the switch element.

16. The selective call receiver in accordance with claim 14, wherein the processor controls the data communication diversity receiver to make an error signal selection for the source of the transitory error signal,
wherein the first receiver element comprises a first signal strength indicator element for indicating a first signal strength of the radio signal received from the first antenna feed, and wherein the second receiver element comprises a second signal strength indicator element for indicating a second signal strength of the radio signal received from the second antenna feed, and wherein the error signal selection comprises the first phase-locked loop error signal when the first signal strength is greater than or equal to the second signal strength, and wherein the error signal selection comprises the second phase-locked loop error signal when the first signal strength is less than the second signal strength.

17. The selective call receiver in accordance with claim 16, further comprising:
a first processor element coupled to the first and second receiver elements for making an optimum data bit selection of a received data bit, the received data bit defined as an optimum data bit,
wherein the optimum data bit selection comprises the received data bit as received from the first antenna feed and demodulated by the first receiver element, the first signal strength being greater than or equal to the second signal strength, and wherein the optimum data bit selection comprises the received data bit as received from the second antenna feed and demodulated by the second receiver element, the first signal strength being less than the second signal strength.

18. The selective call receiver of claim 17, further comprising:
a second processor element coupled to the first and second receiver elements for deriving and storing a signal quality indicator bit corresponding to the optimum data bit,
wherein the signal quality indicator bit comprises a first value, the larger of the first and second signal strengths being equal to or greater than a predetermined level during reception of the optimum data bit, and wherein the signal quality indicator bit comprises a second value, the larger of the first and second signal strengths being less than the predetermined level during reception of the optimum data bit; and a third processor element coupled to the second processor element for collecting a plurality of optimum data bits and corresponding signal quality indicator bits to form a data code word and a signal quality indicator word, respectively, each having a bit length defined by a predetermined error correcting code word format.

19. The selective call receiver of claim 18, further comprising:
a fourth processor element for determining whether or not errors in the code word exceed a predetermined limit for a first error correction algorithm;

a fifth processor element coupled to the fourth processor element for processing the code word by the first error correction algorithm, the errors not exceeding the predetermined limit; and a sixth processor element coupled to the fourth processor element for alternatively processing the code word along with the signal quality indicators corresponding to the bits thereof by a second error correction algorithm, the errors exceeding the predetermined limit, wherein the sixth processor element comprises:
a seventh processor element for defining selected received data bits of the data code word to be potentially erroneous, the corresponding signal quality indicator bits being set to the second value; and an eighth processor element coupled to the seventh processor element for applying the second error correction algorithm to correct potential errors in the selected received data bits of the code word defined by the seventh processor element to be potentially erroneous.

20. A method of diversity reception in a data communication receiver comprising a first antenna feed coupled to a first receiver element for demodulating a radio signal containing data bits and for deriving a first phase-locked loop error signal from the radio signal, the data communication receiver further comprising a second antenna feed coupled to a second receiver element for demodulating the radio signal and for deriving a second phase-locked loop error signal from the radio signal, the method comprising the steps of:
(a) measuring the first signal strength of the radio signal from the first antenna feed during reception of a data bit;

(b) measuring a second signal strength of the radio signal from the second antenna feed during reception of the data bit;

(c) selecting the first phase-locked loop error signal to control generation of a common local oscillator signal when the first signal strength is equal to or greater than the second signal strength; and (d) selecting the second phase-locked loop error signal to control generation of the common local oscillator signal when the first signal strength is less than the second signal strength.

* * * * *